Nov. 16, 1954  C. O. ODEGARDEN  2,694,493
BLOWER ATTACHMENT FOR COMBINES
Filed Feb. 8, 1952  2 Sheets-Sheet 1
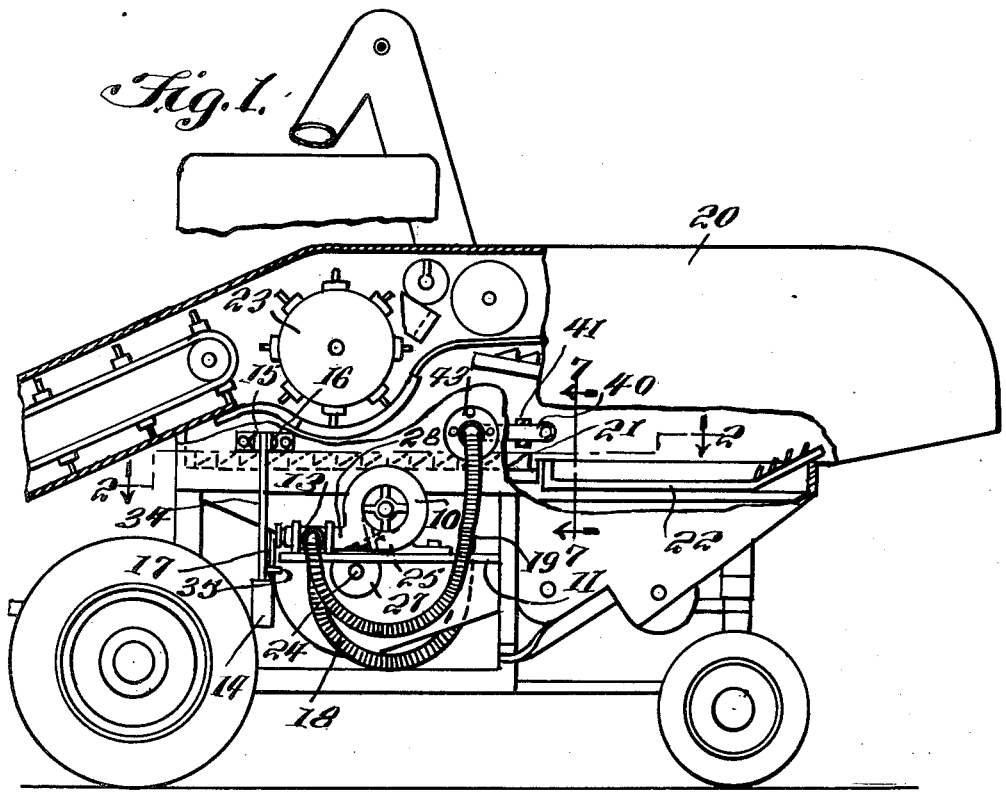
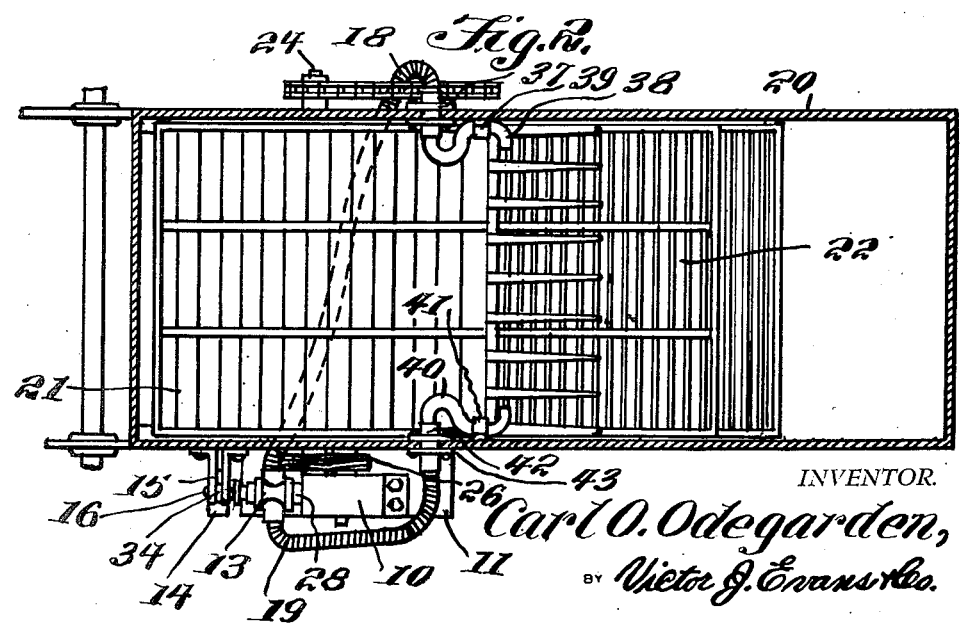
INVENTOR.
Carl O. Odegarden,
BY Victor J. Evans & Co.
ATTORNEYS

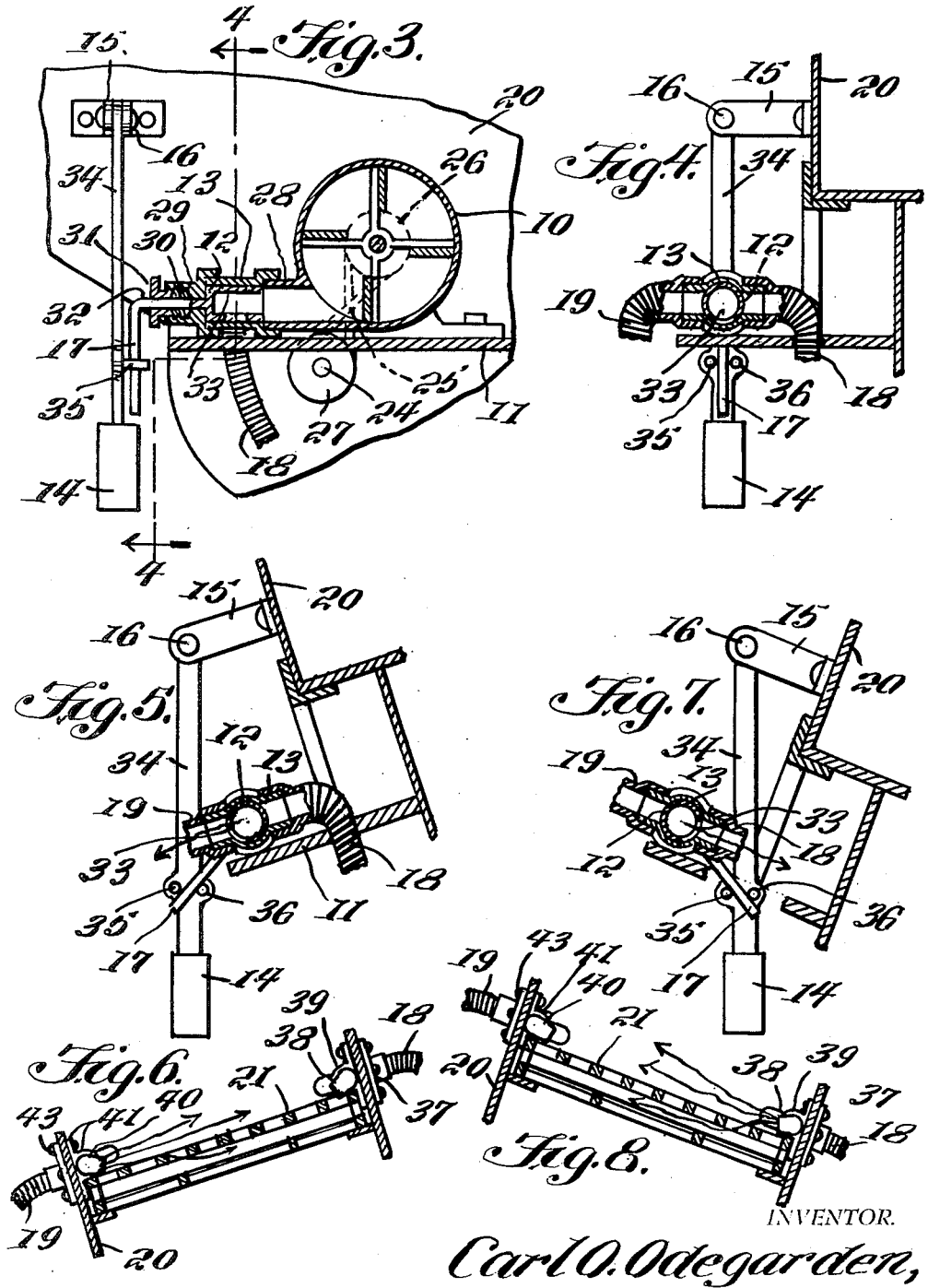

United States Patent Office 2,694,493
Patented Nov. 16, 1954

2,694,493

BLOWER ATTACHMENT FOR COMBINES

Carl O. Odegarden, Chatfield, Minn.

Application February 8, 1952, Serial No. 270,605

1 Claim. (Cl. 209—261)

This invention relates to grain harvesting equipment, and in particular an attachment for a combine which prevents accumulation of grain on the low side of a grain pan when the combine is operated on the side of a hill and which automatically shifts to blow the grain from the opposite side when the elevator changes whereby grain is always distributed across the pan from the low side of the combine.

The purpose of this invention is to prevent accumulations of grain on the low sides of a combine cutting grain on the side of a hill.

With the conventional grain harvesting combine the grain traveling across the grain pan works to the low side as the combine travels over a sloping surface of the ground and the grain accumulating on the low side of the grain pan reduces the efficiency of the combine. Furthermore, accumulations of grain on one side of the grain pan slow down the progress of the combine as it is necessary to stop and remove the grain at regular intervals. With this thought in mind this invention contemplates an attachment for a combine wherein a blower is mounted on one side of the combine and provided with discharge tubes that enter the combine housing on opposite sides of the grain pan and in which means is provided in the tubes for directing the discharge of the fan through the tube on the low side of the combine.

The object of this invention is, therefore, to provide an attachment adapted to be incorporated in a grain combine whereby blasts of air may be directed over the grain pan to prevent accumulations of grain on one side and wherein the blasts of air are supplied only on the low side of the grain pan.

Another object of the invention is to provide a blower attachment for preventing accumulations of grain on one side of a grain combine that is adapted to be installed on combines now in use.

A further object of the invention is to provide a blower attachment for distributing grain over a grain pan of a combine which is of a simple and economical construction.

With these and other objects and advantages in view the invention embodies a blower, a bracket for mounting the blower on a combine, a valve positioned in the discharge of the blower, connections from the valve to opposite sides of the combine housing, and means for actuating the valve whereby the discharge of the blower is carried to the low side of the combine with the combine operating on an incline and wherein the discharge is shut off when the combine is operating on level ground.

Other features and advantages of the invention will appear from the following description taken in connection with the drawings wherein:

Figure 1 is a side elevational view of a grain combine with parts broken away showing the concave, grain pan, and chaffer, and illustrating the blower with discharge tubes mounted on the side of the combine.

Figure 2 is a sectional plan taken on line 2—2 of Fig. 1 also illustrating the position of the blower with discharge tubes extended therefrom.

Figure 3 is a longtiudinal section through the blower housing and discharge thereof illustrating the gravity actuated valve in the discharge connection.

Figure 4 is a cross section taken on line 4—4 of Fig. 3 showing the valve in the discharge connection of the blower in the neutral or closed position.

Figure 5 is a section similar to that shown in Fig. 4 wherein the valve is actuated to discharge air from the blower to one side of the combine.

Figure 6 is a detail illustrating a section through the grain pan of the blower showing the air entering from the low side of the combine.

Figure 7 is a cross section similar to that shown in Fig. 4 illustrating the position of the valve with the combine tilted in a direction opposite to that shown in Fig. 5.

Figure 8 is a detail similar to that shown in Fig. 6 showing the air entering from the opposite side of the combine.

Referring now to the drawings wherein like reference characters denote corresponding parts the blower attachment for grain combines of this invention includes a blower 10 mounted on a bracket 11 at one side of the combine, a cylindrical valve 12 positioned in a discharge connection 13 of the blower 10, a weight 14 pivotally mounted on an arm 15 with a pin 16 and positioned to actuate the valve 12 through a lever 17, and tubular connections 18 and 19 extended from the discharge connection to opposite sides of the combine housing 20 in which a grain pan 21, a chaffer 22, and a concave 23 are positioned.

It will be understood that the blower 10 may be of any type or design and, in the design shown the blower or fan is driven from the main blower shaft 24 of the combine with a belt 25 that is trained over pulleys 26 and 27.

The discharge connection or housing 13 is attached to the neck 28 of the blower housing, as illustrated in Fig. 3 and the outer end is provided with a bearing 29 having a packing gland 30 therein and the packing gland is provided with a nut 31.

The cylindrical valve 12 is provided with a stem 32 which is journaled in the bearing 29 and extends through the packing gland and the lever 17 extends from the outer end of the stem.

The cylindrical valve 12 is also provided with an outlet opening 33 which, with the parts in the positions shown in Fig. 4 extends downwardly to close the discharge connection and with the parts in the position shown in Figs. 5 and 7 the opening extends to provide communication between the discharge of the blower and the tube extended through the low side of the combine.

The lever 34 with which the weight 14 is pivotally mounted on the arm 15 is provided with spaced pins 35 and 36 between which the lever 17 extends and as the weight moves from one side to the other or from the position shown in Fig. 5 to that shown in Fig. 7 the pins 35 and 36 move the lever 17 whereby air is discharged through either the tube 18 or the tube 19. With the side of the combine on which the blower is mounted extended downwardly as illustrated in Fig. 5 air is discharged through the tube 19 which enters the low side of the combine and with the combine tilted in the opposite direction the discharge passes through the tube 18 into the opposite side thereof as illustrated in Fig. 7.

The tube 18 is connected to the side wall of the housing 20 of the combine with a flange 37 and a tube 38 on the inside of the housing, and which is held by a clamp 39 directs the air to a point from which the grain is evenly distributed over the grain pan.

A similar connecting tube 40, held by a clamp 41 is positioned on the opposite side of the housing and this tube is connected to the tube 19 through flanges 42 and 43.

By this means air is automatically blown into the low side of a grain combine whereby the grain is distributed over the grain pan and accumulations of grain on the low side of the grain pan are eliminated.

It will be understood that other modifications may be made in the design and arrangement of the parts without departing from the spirit of the invention.

What is claimed is:

In an attachment for use on a combine having a grain pan, the combination which comprises a blower having a discharge connection, means mounting the blower on one side of the combine, tubes extended from the discharge connection of the blower to opposite sides of the combine and positioned to extend through the walls of the combine and to points above the grain pan thereof, a cylindrical valve in the discharge connection of the blower, said valve having an arm extended from one end, a weight suspended by a lever pivotally mounted on the combine and said lever positioned whereby the arm of the valve extends between a pair of pins mounted on one side thereof and said lever and pins providing means for operating the valve to connect the discharge of the blower to said tubes selectively, whereby the discharge from the blower is connected to the tube entering the combine housing on the low side thereof.

References Cited in the file of this patent
UNITED STATES PATENTS

| Number | Name | Date |
|---|---|---|
| 2,611,487 | Stevenson | Sept. 23, 1952 |